United States Patent
Henriet et al.

(10) Patent No.: US 12,139,427 B2
(45) Date of Patent: Nov. 12, 2024

(54) TREATMENT OF WASTEWATER BY AEROBIC GRANULAR BIOMASS IN CONTINUOUS FLOW

(71) Applicants: JOHN COCKERILL S.A., Seraing (BE); CENTRE BELGE D'ETUDE ET DE DOCUMENTATION DE L'EAU, en abrege CEBEDEAU asbl, Liege (BE)

(72) Inventors: Olivier Henriet, Bovesse (BE); Alain Magis, Oupeye (BE); Christophe Meunier, Floreffe (BE)

(73) Assignees: CENTRE BELGE D'ETUDE ET DE DOCUMENTATION DE L'EAU, EN ABREGE CEBEDEAU ASBL, Liege (BE); JOHN COCKERILL S.A., Seraing (BE)

( * ) Notice: Subject to any disclaimer, the term of this patent is extended or adjusted under 35 U.S.C. 154(b) by 0 days.

(21) Appl. No.: 18/444,801

(22) Filed: Feb. 19, 2024

(65) Prior Publication Data

US 2024/0208845 A1 Jun. 27, 2024

Related U.S. Application Data

(63) Continuation of application No. 18/500,202, filed on Nov. 2, 2023, now abandoned, which is a
(Continued)

(30) Foreign Application Priority Data

May 3, 2021 (EP) ..................................... 21171902

(51) Int. Cl.
*C02F 3/34* (2023.01)
*C02F 3/00* (2023.01)
(Continued)

(52) U.S. Cl.
CPC .............. *C02F 3/301* (2013.01); *C02F 3/006* (2013.01); *C02F 3/34* (2013.01);
(Continued)

(58) Field of Classification Search
CPC .............. C02F 3/301; C02F 3/006; C02F 3/34
See application file for complete search history.

(56) References Cited

U.S. PATENT DOCUMENTS

| | | | |
|---|---|---|---|
| 7,060,185 B2 * | 6/2006 | Kim ........................ | C02F 3/308 210/616 |
| 2020/0048131 A1 | 2/2020 | Stensel et al. | |

FOREIGN PATENT DOCUMENTS

| | | |
|---|---|---|
| WO | WO 2008141413 A1 | 11/2008 |
| WO | WO 2019195918 A1 | 10/2019 |

OTHER PUBLICATIONS

Kent Timothy R et al: "State of the art of aerobic granulation in continuous flow bioreactors", Biotechnology Advances, Elsevier Publishing, Barking, GB, vol. 36, No. 4, Mar. 26, 2018 (Mar. 26, 2018), pp. 1139-1166, XP085400120.
(Continued)

*Primary Examiner* — Chester T Barry
(74) *Attorney, Agent, or Firm* — LEYDIG, VOIT & MAYER, LTD.

(57) ABSTRACT

A reactor based on a generation of aerobic granules in a continuous flow configuration, for biological treatment of biomass including urban or industrial wastewater, the reactor including, in succession, from upstream to downstream: an inlet for wastewater; a first head tank operated in feast mode and under anaerobic conditions; a second tank for performing a function of a biological selector for microorganisms which are favorable to formation of dense structures, operated in feast mode, and subdivided into two compartments, a first compartment being operated successively and alternately under aerobic and anaerobic condi-
(Continued)

tions and vice versa, so that the biomass is exposed in a dynamic way to alternating oxidizing and reducing conditions respectively, and so as to prolong or extend anaerobiosis of the first head tank into the first compartment of the second tank.

14 Claims, 11 Drawing Sheets

Related U.S. Application Data continuation-in-part of application No. PCT/EP2022/061602, filed on Apr. 29, 2022.

(51) Int. Cl.
    *C02F 3/30*     (2023.01)
    *C02F 1/00*     (2023.01)

(52) U.S. Cl.
    CPC .. *C02F 2001/007* (2013.01); *C02F 2003/001* (2013.01); *C02F 2203/004* (2013.01); *C02F 2209/22* (2013.01); *C02F 2209/38* (2013.01); *C02F 2209/44* (2013.01)

(56) References Cited

OTHER PUBLICATIONS

Beun J. J. et al: "Aerobic Granulation in a Sequencing Batch Reactor", Pergamon, Elsevier Science Ltd., vol. 33, No. 10, Feb. 1999, pp. 2283-2290, Great Britain.
Suez "Degremont water handbook", Degremont, wastewater typology, pp. 1-5, internet link: https:web.archive.org/web/20210512070906/https://www.suezwaterhandbook.com/water-and-generalities/fundamental-biological-engineering-processes-applicable-to-water-treatment/general/wastewater-typology (May 12, 2021).

* cited by examiner

With biological selector

Withouth biological selector

FIG. 10

TREATMENT OF WASTEWATER BY AEROBIC GRANULAR BIOMASS IN CONTINUOUS FLOW

CROSS-REFERENCE TO PRIOR APPLICATIONS

This application is a continuation of U.S. application Ser. No. 18/500,202, filed on Nov. 2, 2023, now abandoned, which is a continuation-in-part of International Patent Application No. PCT/EP2022/061602, filed on Apr. 29, 2022, which claims priority to European Patent Application No. EP 21171902.6, filed on May 3, 2021. The entire disclosures of the foregoing applications are hereby incorporated by reference herein.

FIELD

The present invention relates to a method for treating of municipal or industrial wastewater using aerobic granular sludge (AGS) technology.

BACKGROUND

The treatment of wastewater on an industrial scale makes extensive use of biological methods based on the use of free cultures in the aerobic phase, which thus entails very significant energy costs for the aeration of the tanks and extremely vast ground surface areas for the clarification process. Nevertheless, these methods offer treatment performance outcomes that are unmatched.

As a result of the work of the University of Delft, a new type of treatment process emerged about twenty years ago, which implements aerated granular cultures in which the purifying microorganisms are in the form of agglomerates measuring from 0.2 to 4 mm. Each of these particles contains specific zones that are suitable for treating different pollutants (carbon, nitrogen, phosphorus). Aerobic granular sludge (AGS) technology is a compact, and energy-efficient biological wastewater treatment method.

In this context, the term "feast-famine regime" is used to refer to short feeding periods selected so as to create periods of feast and famine (J. J. Beun et al., Aerobic granulation in a sequencing batch reactor, Water Research, Vol. 33, No. 10, 1999 pp. 2283-2290), characterized respectively by the presence or absence of organic matter in the liquid medium. With this feeding strategy, the selection of micro-organisms that are appropriate for forming granules is achieved. When the concentration of substrate in the raw liquid is high, the organisms that form granules are able to store organic matter in the form of intracellular poly($\beta$-hydroxybutyrate) (PHB), which they then consume during the famine period, which gives them a competitive advantage over filamentous organisms.

The main drawback of this method is related to its start-up, which is based on the formation of a veritable biofilm that is suspended (or self-supported), without any support.

According to initial experimental feedback, this type of culture, in the aerobic phase, makes it possible to obtain the same efficiency and performance outcomes as the conventional treatment based on "activated sludge" i.e. CAS (for Conventional Activated Sludge), while at the same time reducing energy consumption (by up to −25%) as well as the land footprint. Furthermore, the step for clarifying the treated waters is greatly simplified, thanks to the outstanding settleability of the granules. It is therefore a treatment method that is likely to become increasingly widespread in the future, given the economic pressures on the operating costs of current treatment facilities. This method is based on the implementation of a specific hydraulic feed regime, which is coupled with selective wasting of the biomass. Paradoxically, only a few commercial water treatment companies seem to be interested in it, the most notable among them being the Dutch engineering group Royal HaskoningDHV.

There are thus very few commercially available AGS technologies that resort to sequential batch reactors (SBRs). A large number of existing wastewater treatment facilities consist of long, continuous flow reactors which would also not be readily adaptable for SBR retrofitting. Thus, a continuous flow method is preferable for municipalities that are not able to make economically reasonable investments in commercially available SBR technologies.

Patent application US 2020/0048131 A1 (Ovivo Inc., Montreal, CA) discloses a continuous flow granular/flocculent sludge wastewater method that selects for granule biomass capable of nitrogen and phosphorus removal and controls granule size and concentration of granular and flocculent sludge for optimal nutrient, organic, and solids removal in a smaller footprint. This method includes anaerobic, anoxic, and aerobic process zones, a first reactor loaded with high soluble biodegradable COD (Chemical Oxygen Demand) operating under anaerobic or anoxic conditions, a granular sludge classifier with recycle of underflow granular sludge to the first reactor (anaerobic/anoxic overflow), a secondary clarifier for settling the flocculent sludge and particles, and a system for recycling the underflow flocculent sludge originating from the secondary clarifier to an aerobic process zone so as to provide the granules with a competitive advantage. The discharge of sludge from the two distinctly separate recycle lines controls the concentrations of bioprocess flocculent and granular sludge and the SRTs (solid retention times). The bypass around and recycle flow to the classifier, so as to maintain the desired flow under various influent flow conditions, help in controlling the size of granules. On/off mixer operation of the anaerobic and anoxic reactors may be used. It is possible to waste the sludge on the two recirculation lines to control the ratio of floc sludge to granular sludge (flocs/granules ratio). The classifier is equipped with a bypass and a recirculation system to control the upward flow.

This document mentions the sub-division of the biological tank into a small aerated compartment (aerobic feast) and a large aerated compartment (aerobic famine). Thus it advantageously exploits the securing of famine but does not however, envisage dynamic aeration management.

According to patent application WO 2019/195918 A1 (University of Manitoba, Winnipeg, CA), laboratory and pilot-scale experimentation has demonstrated that stable granulation can be achieved in a continuous flow configuration that is suitable for retrofit into an existing infrastructure. An anoxic/anaerobic/aerobic configuration can be designed and implemented in a stable manner for the conversion of flocculent biomass to AGS. Preliminary pilot-scale results relating to the primary effluent from a municipal wastewater treatment facility indicated that it is possible for granules measuring from 0.2-0.5 mm, SVI<75 mL/g and SVI(30 min)/SVI(5 min)>70% to form within a month of steady operation.

This document describes a reactor comprising successively a header anoxic compartment, an anaerobic compartment (feeding point), and an aerobic compartment. The aerobic zone is divided into two aerobic compartments, a first compartment (occupying 10 to 30% of the volume) providing a feast zone and a second, larger compartment providing a famine/zone (occupying 70 to 90% of the volume). A selective wasting concept is also described.

These patents are exclusively applicable to continuous reactors.

Patent application WO 2008/141413 A1 discloses a wastewater treatment system using aerobic granules which comprises a large number of sequencing batch reactor with high volumetric exchange rate, a variable cycle length, and constant batch volume. The batch reactors are operated for C, N removal, while P is removed chemically. The suspended solids are removed in a downstream separation step. A continuous flow reactor may comprise an aerobic zone, an alternately aerobic and anoxic zone, or discrete aerobic and anoxic zones, as well as a settling zone. An anaerobic zone may be located at the bottom of a mass of settled granules. Feed may be introduced through the settled granules. An aerobic/anoxic zone may be like a CSTR (Completely Stirred Tank Reactor) but with aeration varying in space or time. Sludge granules may move intermittently from an aerobic zone to an aerobic/anoxic zone. A settling zone may have an upflow rate so as to wash off flocculated biomass. A dual sludge method may be used in which a fraction of unsettled floc is recycled to a region upstream of the granules settler.

A fermentation zone may be used to pre-treat the feed water or to treat a recycled waste stream, for example a waste stream that contains floc.

SUMMARY

In an embodiment, the present invention provides a reactor based on a generation of aerobic granules in a continuous flow configuration, for biological treatment of biomass including urban or industrial wastewater, the reactor comprising, in succession, from upstream to downstream: an inlet for wastewater; a first head tank operated in feast mode and under anaerobic conditions; a second tank configured to perform a function of a biological selector for microorganisms which are favorable to formation of dense structures, operated in feast mode, and subdivided into two compartments, a first compartment being configured so as to be operated successively and alternately under aerobic and anaerobic conditions and vice versa, so that the biomass is exposed in a dynamic way to alternating oxidizing and reducing conditions respectively, and so as to prolong or extend anaerobiosis of the first head tank into the first compartment of the second tank, and to effect a corresponding prolongation of a storage of at least 70% of readily biodegradable COD in a form of polymers, and a second compartment configured so as to be operated continuously under aerobic conditions; a third tank operated in famine mode, configured so as to be controlled under aerobic or anoxic conditions, famine conditions being obtained by limiting a mass load to 0.35 kg COD kg$^{-1}$VSS day$^{-1}$; and a physical or gravity selector configured to select particles with a high settling velocity of at least 2 m/h, and for carrying out a recirculation of the particles to the inlet of the reactor while also allowing for transfer of other sludge to a clarification structure, the clarification structure comprising a first outlet for an effluent and a second outlet for the recirculation of sludges to the third tank of the reactor and for wasting of excess sludge, wherein the first compartment of the second tank are provided with aeration means, means for measuring a content of dissolved oxygen and a quantity of injected air, based on an air flow rate or an operating speed of the aeration means, and regulation-control means that enable, by controlling aeration, switching from the aerobic mode to the anaerobic mode and vice versa in the first compartment of the second tank based on a set point value for an oxygen demand, the oxygen demand being measured as a quantity of oxygen to be supplied so as to reach and maintain a determined content of dissolved oxygen as the set point value, in mgO$_2$/L, the anaerobic mode being selected or maintained for a value greater than the set point value, a period of pause in aeration then being observed prior to resuming aeration and the aerobic mode.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 10 is a chart mapping the dynamics of the microbial populations during the different phases of the tests (Day 1=21 Sep. 2018). Each number indicates the percentage of "reads" that can be attributed to a microorganism.

DETAILED DESCRIPTION

Figure 1A:
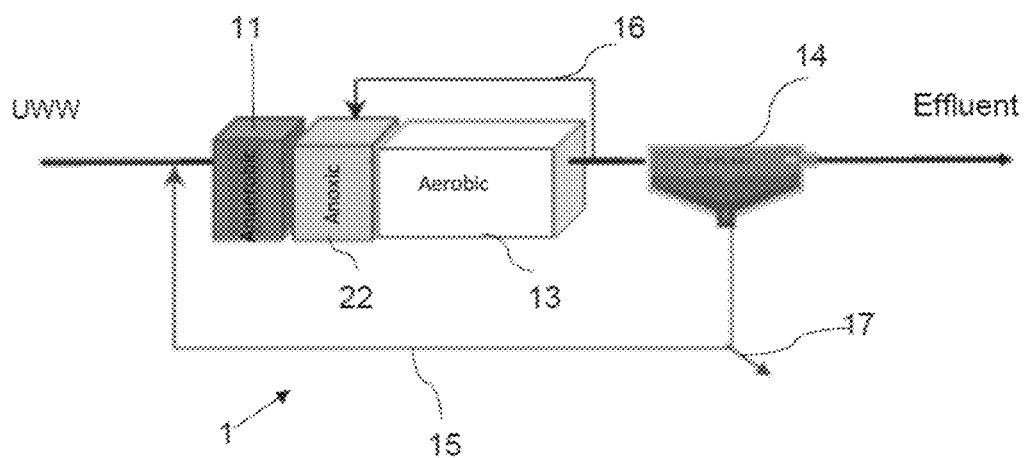
FIG. 1 comparatively represents the respective operating flow diagrams for a conventional activated sludge method (FIG. 1A) and the treatment method according to the invention (FIG. 1B).

In an embodiment, the present invention provides a reactor and a method for the treatment of biomass mainly in the form of municipal or industrial wastewater, by utilizing aerobic granular sludge technology, which can offer high performance efficiency in continuous flow operation, as compared to conventional methods/reactors [conventional activated sludge (CAS), membrane bioreactor (MBR), mixed bed bio reactor (MBBR), integrated fixed-film activated sludge (IFAS), moving bed biofilm membrane bioreactor (MB-MBR), etc.] or other competing technologies (granular sequential batch reactor (SBR)).

In an embodiment, the present invention provides method conditions which provide for the stable formation of biological nutrient removal (BNR) granules and consequently good settling of the treated sludge.

In an embodiment, the present invention provides one or more tools for monitoring the evolving changes in the biomass in the reactor.

In an embodiment, the present invention provides a reactor based on the generation of aerobic granules in a continuous flow configuration, for the biological treatment of biomass in the form of urban or industrial wastewater, the reactor comprising, in succession, from upstream to downstream:
  an inlet for wastewater;
  a first head tank operated in feast mode and under anaerobic conditions;
  a second tank that performs the function of a biological selector for microorganisms which are favorable to the formation of dense structures such as granules, operated in feast mode, and subdivided into two compartments, a first compartment being configured so as to be operated successively and alternately under aerobic and anaerobic conditions and vice versa, so that the biomass is exposed in a dynamic way to alternating oxidizing and reducing conditions respectively, and so that it is possible to prolong or extend the anaerobiosis of the first head tank into said first compartment of the second tank, and to effect a corresponding prolongation of the storage of at least 70%, preferably at least 90%, of readily biodegradable COD in the form of polymers, and a second compartment configured so as to be operated continuously under aerobic conditions;
  a third tank, operated in famine mode, configured so as to be controlled under aerobic or anoxic conditions, the famine conditions in the third tank being obtained by means that limit the mass load to 0.35 kg COD $kg^{-1}VSS$ $day^{-1}$, preferably to 0.25 kg COD $kg^{-1}VSS$ $day^{-1}$;
  a physical or gravity selector, which is suitable for selecting particles with a high settling velocity of at least 2 m/h, preferably at least 3 m/h, and for carrying out a recirculation of these particles to the inlet of the reactor, while also allowing for the transfer of other sludge to a clarification structure;
  the aforementioned clarification structure being provided with a first outlet for an effluent and a second outlet for the recirculation of sludge to the third tank, and for the wasting of excess sludge;
  the first compartment of the second tank being provided with means for measuring the content of dissolved oxygen, aeration means, and regulation-control means that enable, by controlling aeration, switching from the aerobic mode to the anaerobic mode and vice versa in the first compartment of the second tank on the basis of a set point value for the quantity of oxygen to be supplied so as to reach and maintain the content of dissolved oxygen, the anaerobic mode being selected or maintained for a value greater than this set point value, a period of pause in aeration then being observed prior to resuming the aeration and thus the aerobic mode.

The feast conditions in the second tank correspond, in the present invention, to a residual presence of less than 30%, and ideally less than 10%, of the initial readily biodegradable COD ($COD_{fbio}$) of the wastewater.

The famine conditions in the third tank are obtained according to the invention by limiting the mass load to 0.35 kg COD $kg^{-1}VSS$ $day^{-1}$, preferably to 0.25 kg COD $kg^{-1}VSS$ $day^{-1}$.

These famine conditions are controlled on the one hand thanks to the biological selector (second tank) which makes it possible to prolong the storage and therefore reduces the $COD_{fbio}$ at the inlet of the third tank; and on the other hand, by recirculating the settled sludge from the clarifier to the third tank (the "VSS" denominator therefore increases between the second and third tanks).

The recirculation of sludge from the clarifier to the third tank makes it possible to limit the returns at the head of the reactor to only the dense sludge coming from the physical selector. This strategy makes it possible to obtain an F/M ratio greater than 5 kg of $COD_{fbio}$ $kg^{-1}$ VSS, preferably greater than 10 kg $COD_{fbio}$ $kg^{-1}$ VSS in the first tank, while at the same time reducing the value of "M", which corresponds to an improvement of the feast conditions in the first tank.

The use of alternating anaerobic and aerobic conditions is well covered in the teachings of the state of the art with a view to selecting the phosphate-removing metabolisms, but is, however, not a condition that is sufficient for granulating or densifying the biomass, as demonstrated by the operation of conventional activated sludge methods.

It should be noted that, unlike the invention, patent application WO 2008/141413 A1 (see in particular FIG. 10) does not provide any information on the dimensions of the second (normally aerobic) tank and neither does it envisage an extension of the first anaerobic tank by operating this second tank in anaerobic mode.

It is also important to remember that the selection of filamentous or dense microorganisms is conditioned by the concentrations of pollutants in direct contact with the biomass (feast, famine) and the type of electron acceptors present in the medium. In particular, anoxic conditions (presence of bound oxygen in nitrites or nitrates) should be distinguished from strict anaerobic conditions (absence of oxygen, nitrites, nitrates).

The alternation of aerobic/anoxic tanks described in patent application WO 2008/141413 A1 (FIG. 10) does not correspond to the objective of the present invention, but to a configuration that is favorable to the removal of total nitrogen by nitrification (aerobic)-denitrification (anoxic).

The present invention is in fact based on the set up of a second compartmentalized tank which makes it possible:
  (1) to increase the kinetics of storage of readily biodegradable COD ($COD_{fbio}$) while at the same time promoting the development of biopolymer accumulating bacteria such as polyphosphate accumulating organisms (PAOs) and glycogen accumulating organisms (GAOs), via a possible dynamic extension of the anaerobic contact time as a function of the load treated, by operating the first compartment of the second tank anaerobically during load peaks. The contact time of the first compartment of the second tank is preferably short (for example ~10 min) to minimise the production of nitrites and nitrates (for example <0.5 mg/L) and to ensure strict anaerobic conditions in the first compartment of the second tank during the pausing of the aerated phases;

(2) to avoid leakage of the $COD_{fbio}$ into the third aerobic tank in famine mode by increasing the yields of $COD_{fbio}$ storage in the first two tanks in feast mode under anaerobic and aerobic conditions (the second compartment of the second tank being always operated under aerobic conditions).

The feast conditions are always present in the first anaerobic tank and the first compartment operated under aerobic conditions in the second tank. It is the compartmentalization of the second tank that ensures aerobic feast conditions followed by aerobic (or anoxic) famine in the third tank.

According to particular embodiments of the invention, the reactor further includes at least one of the following features or an appropriate combination of a plurality thereof:

the first compartment and the second compartment of the second tank have the same size, each of these compartments being smaller than the third tank;

the distribution of the relative sizes of the tanks in relation to the available volume is respectively from 20 to 30% for the first tank, 5 to 10% for the second tank, and 60 to 75% for the third tank;

the first tank is compartmentalized;

the third tank may itself be so configured, or followed by a fourth tank that is configured so as to perform simultaneous nitrification and denitrification processes;

the reactor includes a bypass to limit the hydraulic load on the physical or gravity selector.

According to some embodiments, the present invention relates to a reactor based on the generation of aerobic granules in a continuous flow configuration, for the biological treatment of biomass in the form of urban or industrial wastewater, the reactor comprising, in succession, from upstream to downstream:

an inlet for wastewater;

a first head tank operated in feast mode and under anaerobic conditions;

a second tank that performs the function of a biological selector for microorganisms which are favorable to the formation of dense structures such as granules, operated in feast mode, and subdivided into two compartments, a first compartment being configured so as to be operated successively and alternately under aerobic and anaerobic conditions and vice versa, so that the biomass is exposed in a dynamic way to alternating oxidizing and reducing conditions respectively, and so that it is possible to prolong or extend the anaerobiosis of the first head tank into said first compartment of the second tank, and to effect a corresponding prolongation of the storage of preferably at least 70%, and more preferably at least 90%, of readily biodegradable COD in the form of polymers, and a second compartment configured so as to be operated continuously under aerobic conditions;

a third tank operated in famine mode, configured so as to be controlled under aerobic or anoxic conditions, the famine conditions being preferably obtained by limiting the mass load to 0.35 kg COD $kg^{-1}$VSS $day^{-1}$, and more preferably to 0.25 kg COD $kg^{-1}$VSS $day^{-1}$;

a physical or gravity selector which is suitable for selecting particles preferably with a high settling velocity of at least 2 m/h, and more preferably at least 3 m/h, and for carrying out a recirculation of these particles to the inlet of the reactor while also allowing for the transfer of other sludge to a clarification structure;

the aforementioned clarification structure, being provided with a first outlet for an effluent and a second outlet for the recirculation of sludges to the third tank of the reactor and for the wasting of excess sludge;

the first compartment of the second tank being provided with aeration means, means for measuring the content of dissolved oxygen and the quantity of injected air, based on the air flow rate or the operating speed of the aeration means, and regulation-control means that enable, by controlling aeration, switching from the aerobic mode to the anaerobic mode and vice versa in the first compartment of the second tank on the basis of a set point value of the oxygen quantity, preferably in the range 30-50 mg $O_2$ $g^{-1}$VSS $h^{-1}$, and more preferably of about 50 mg $O_2$ $g^{-1}$VSS $h^{-1}$, to be provided to attain and maintain a determined content of dissolved oxygen, the anaerobic mode being selected or maintained for a value greater than this set point value.

According to some embodiments, in anaerobic mode, dissolved oxygen may be no longer be measurable. In this case a period of pause may be provided before reoxygenating the tank, i.e. switching to aerobic mode. This aeration stopping time may be typically of 10 to 20 minutes before resuming aeration.

The present invention also relates to a method for the biological treatment of urban or industrial wastewater by means of the aerobic granule generation based reactor in a continuous flow configuration, as described above, characterized in that it includes at least the following steps, in succession, in the upstream to downstream direction:

the wastewater is introduced at the inlet of the continuous flow reactor;

the wastewater is treated in the first head tank operated in feast mode and under anaerobic conditions;

the wastewater exiting from the first head tank is treated in the second tank, which performs the function of a biological selector of microorganisms that are favorable to the formation of dense structures such as granules; and more precisely, the first compartment is operated in feast mode according to dynamic management of the oxygen supply, based on a measurement, in the first compartment of the second tank, of the content of dissolved oxygen and the quantity of air injected, on the basis of the air flow rate or the operating speed of the aeration means; with this being translated into an oxygen demand value, which is the parameter selected to switch from the aerobic operating mode to the anaerobic operating mode and vice versa, and the second compartment is operated continuously under aerobic conditions, in feast mode. The oxygen demand is (equivalent to) the specific rate of oxygen consumption [or specific oxygen uptake rate (SOUR)]. Operation occurs under continuous aerobic conditions in the second compartment of the second tank, which is smaller than the third tank, so as to secure famine in the latter;

the wastewater exiting from the second tank is treated in the third tank operated under aerobic or anoxic conditions, in famine mode;

in the physical or gravity selector, the granules are left to sediment and a fraction of these granules is recirculated at the inlet of the continuous flow reactor;

in the clarification structure, an effluent is allowed to exit the reactor at a first outlet and, at a second outlet, the sludge is recirculated, to the third tank of the continuous flow reactor, with a portion of said sludge being wasted;

wherein, by means of the dynamic management of the oxygen supply, the anaerobiosis phase taking place in the first head tank is prolonged/extended into said first compartment of the second tank, as long as the oxygen demand is greater than a set point value of 30-50 mg $O_2$ $g^{-1}$VSS $h^{-1}$, said oxygen demand being measured as the quantity of oxygen to be supplied so as to reach and maintain this set point value, a period of pause in aeration being observed before resuming the aeration and thus a phase of aerobiosis, based on a hydraulic residence time in the first compartment of the second tank being between 5 and 30 minutes and therefore chosen, on the one hand, to increase the efficiency of storage of the readily biodegradable COD in the form of polymers while also limiting the leakage of said readily biodegradable COD into the third tank; and on the other hand, to minimize the production of nitrites and nitrates.

Oxygen demand, as used herein to define selector control, is equivalently the quantity of oxygen (in mg $O2$ $h^{-1}$) consumed by 1 g of microorganisms (expressed in g VSS). The unit of oxygen demand is therefore mg $O2$ $g^{-1}$ VSS·$h^{-1}$.

According to particular embodiments of the invention, the method further includes at least one of the following features or an appropriate combination of a plurality thereof:

the stored polymers are polyhydroxyalkanoates (PHAs);

the prolongation/extension of the anaerobiosis phase into said first compartment of the second tank takes place in the event of load peaks;

the rate of recirculation of the sludges in the clarification structure is modified to vary and control the rise rate in the physical or gravity selector and therefore the granule selection pressure;

the abundance of a floc-forming microorganism, for example *Zoogloea* spp., is monitored to detect any dysfunction in the biological selector.

The method according to the present invention consists in implementing a biological treatment technology that utilizes granules in a continuous flow configuration offering a series of advantages as compared to conventional methods (CAS, MBBR, IFAS, MBR, etc.) or competing methods (granular SBR).

Conventional activated sludge treatment facilities (for example: $A_2O$, UCT, Bardenpho methods) are designed via a succession of structures, the main ones being set out below (FIG. 1A):

pre-treatments;

first biological tank operated under anaerobic conditions 11;

second biological tank operated under anoxic conditions 22;

third biological tank operated under aerobic conditions 13;

clarification structure (or settler) 14.

Figure 1B:
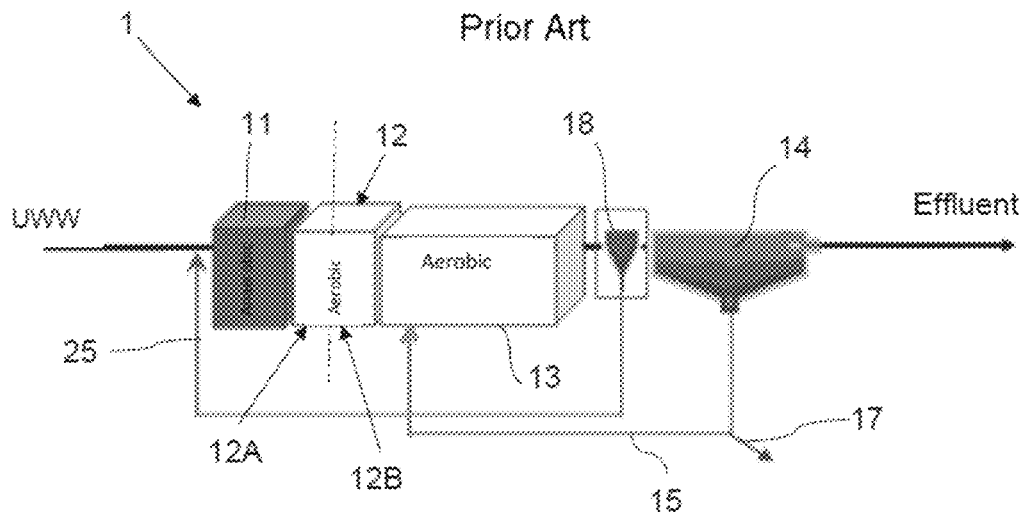

The method according to the invention will be integrated into this basic operational diagram (FIG. 1B).

Figure 2:
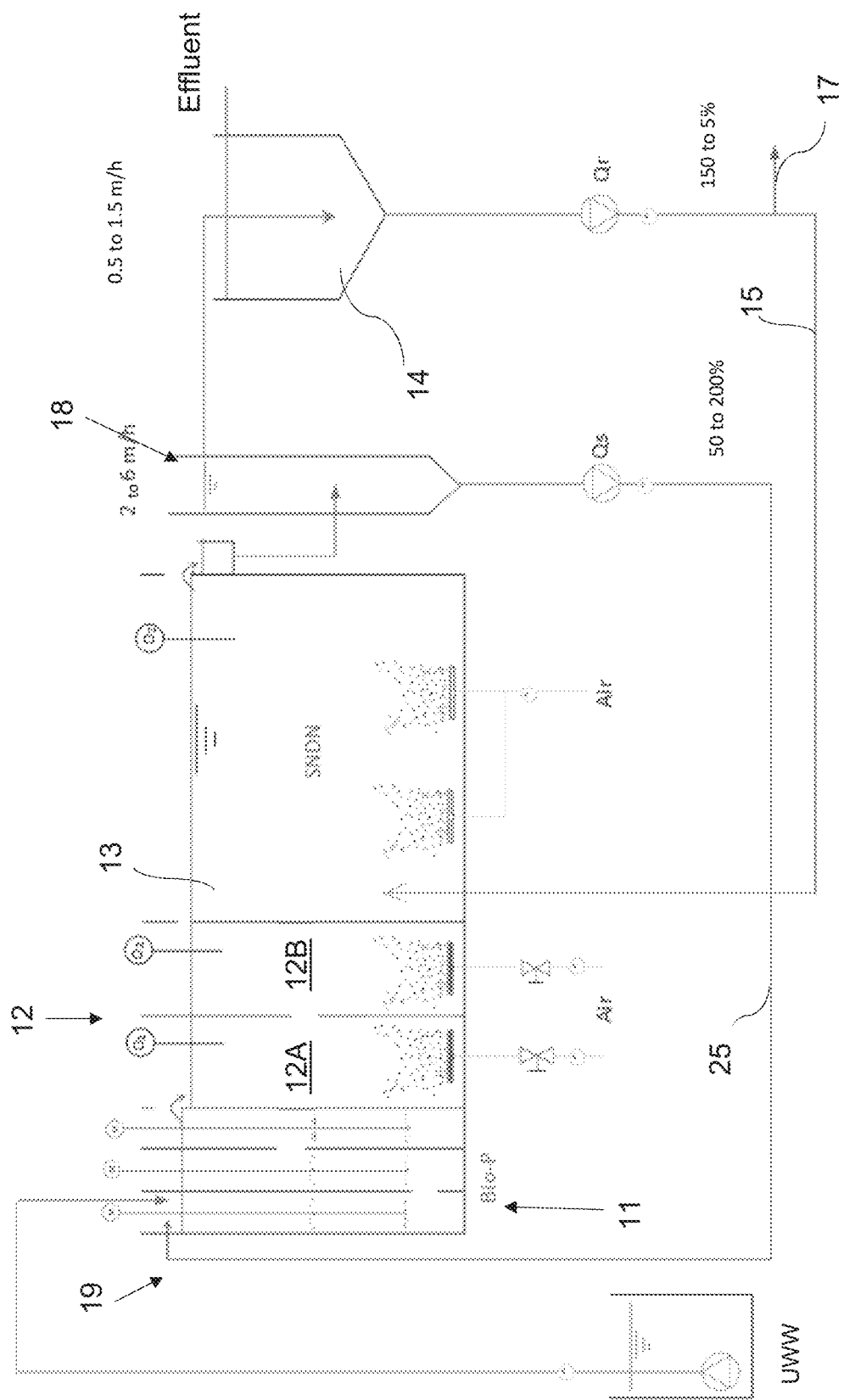
FIG. 2 represents the schematic diagram for the method according to the invention.

However, according to the invention, the development of aerobic granules requires the installation of two specific additional structures (FIG. 2) that ensure two types of selection pressure on the conventional biomass:

a tank 12, subdivided into two compartments 12A, 12B, intended for carrying out a biological selection for the microorganisms that are favorable to the formation of dense structures;

a physical (or gravity) selector 18 for triggering the separation of particles characterized by high settling velocities.

Biological Selection

In conventional activated sludge (CAS) processes, the concept of metabolic and kinetic selection has been widely exploited to specifically cultivate certain types of functional bacteria, with the aim of optimizing the removal of nutrients (N, P) or to prevent the proliferation of filamentous bacteria. To this end, conventional activated sludge treatment facilities (for example: $A_2O$, UCT, Bardenpho methods) are designed based on a succession of bioreactors (anaerobic, anoxic, aerobic). Conventionally, preventive actions aimed at combatting the development of filamentous bacteria are based on the installation of additional contact tanks (biological selectors) at the head of the facility for effluents that are particularly fermentable. These structures have a very marked, and non-linear effect on the settleability of sludges. The design of these tanks is based on a contact time that is sufficient to enable the readily biodegradable soluble COD ($COD_{fbio}$) to diffuse and be assimilated preferentially by bacteria of floc forming morphotypes, which compete with filaments for the same substrates. However, an unsuitable contact time (as a result of variations in the hourly flow rate to be treated) results in $COD_{fbio}$ concentrations that are too low or a reaction time that is too short with the biomass, which favors the selection of filamentous micro-organisms. This predisposition to the selection of filamentous or dense microorganisms is also conditioned by the type of electron acceptors present in the medium. In addition, three operating conditions can be distinguished for a bioreactor: aerobic (in the absence of molecular oxygen), anoxic (in the presence of bound oxygen as in nitrites or nitrates), and strictly anaerobic (in the absence of $O_2$, nitrites and nitrates).

The originality of the method according to the invention lies in combining an anaerobic head compartment 11 dedicated to biological phosphorus removal by overaccumulation (Enhanced Biological Phosphorus Removal (EBPR)) with a second compartment 12 or 12A/12B that is suitable for performing a kinetic biological selection, with this being independent of the hourly variations in loads or flow rates. In concrete terms, this structuring of the flocs is obtained by installing aeration ramps and ad hoc instrumentation (pO2) that enable the dynamic management of the oxidation-reduction conditions in the second biological tank, which has been compartmentalised in advance.

This dynamic management is based on the oxygen demand, which is, according to the present invention, the factor that triggers aeration switching. When the oxygen demand is high in the first compartment of the second tank, it is assumed that the readily assimilable (biodegradable) COD remains abundant and that the storage under anaerobic conditions is to be prolonged into the first compartment of the second tank; conversely, when the oxygen demand is/becomes low in the first compartment of the second tank, it is assumed that the readily assimilable COD is not abundant and that aeration of the first compartment of the second tank may be initiated.

An oxygen demand greater than 50 mg $O2$ $g^{-1}$VSS $h^{-1}$, and ideally already greater than 30 mg $O2$ $g^{-1}$VSS $h^{-1}$, justifies a prolongation of the anaerobic conditions in the first compartment of the second tank.

The oxygen demand may advantageously be determined on the basis of the oxygen supply, by one or more aeration devices required to achieve a dissolved oxygen set point in the first compartment of the second tank. A high oxygen demand corresponds to a significant supply of oxygen by these aeration devices to reach said set point.

For the one skilled in the art, there is a clear relation between a quantity of air injected to a compartment of the reactor, a certain concentration of dissolved oxygen and the oxygen demand. In practice, for a known tank geometry and VSS concentration, the oxygen demand can be transformed into an air flow rate and vice versa.

Knowing the characteristics of the aeration machine, the air flow rate can also be linked to the operating speed of the machine. In this way, the air flow rate and the operating speed of the machine are parameters that are easy measurable in practice.

The quantity of oxygen supplied may advantageously be measured by means of ad hoc instrumentation, for example a pO2 probe, an air flow meter, and a variable speed drive for the aeration equipment.

The hydraulic residence time of this compartment and management thereof are such that the production of nitrites and nitrates is avoided (strict anaerobic conditions in the absence of aeration).

Figure 3A:
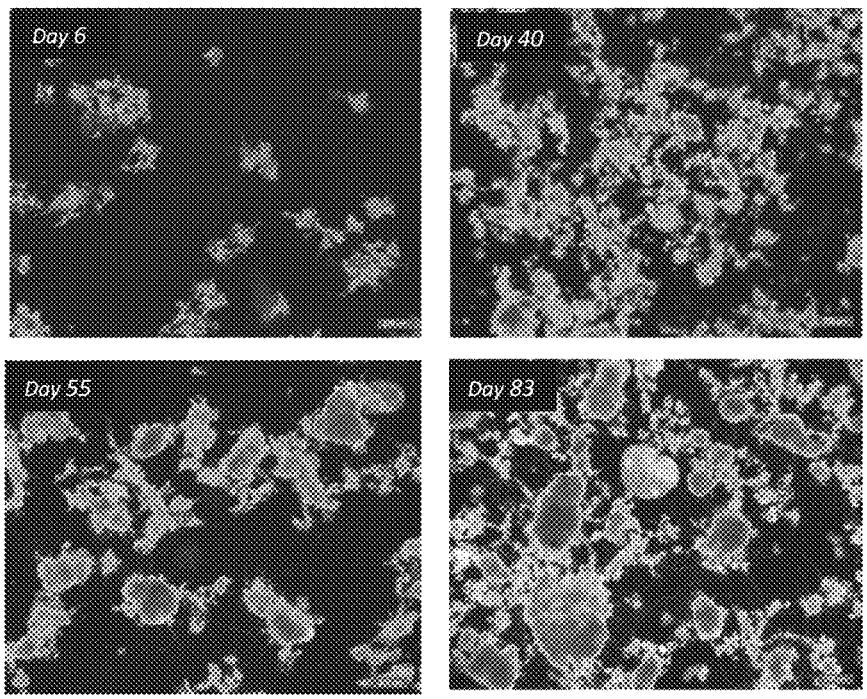
FIG. 3 represents the micrographs showing phase contrast of the biomasses obtained with the method according to the invention, at 4× magnification, with (FIG. 3A) and without (FIG. 3B) the biological selection structure.
Figure 3B:
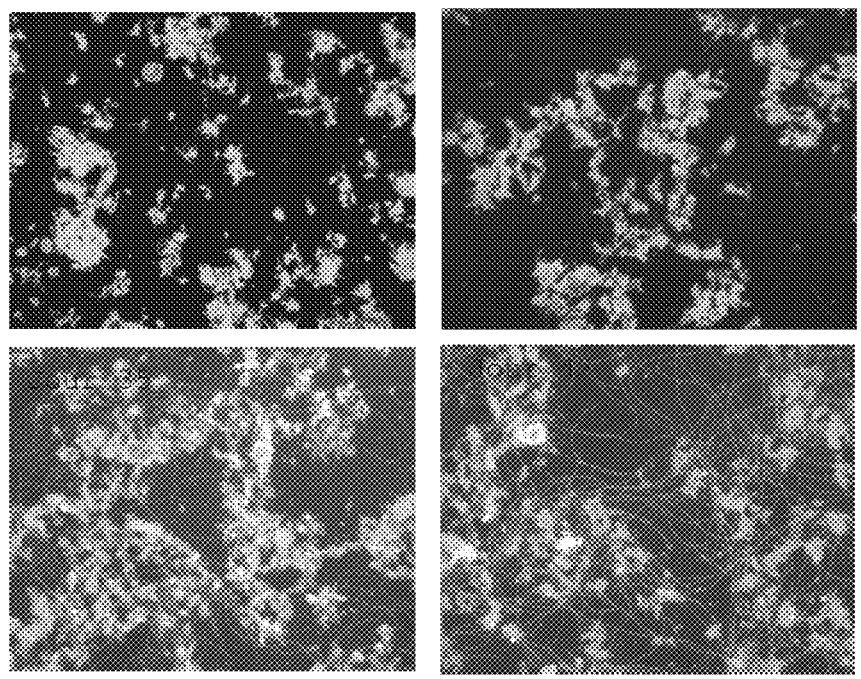
Figure 4A:
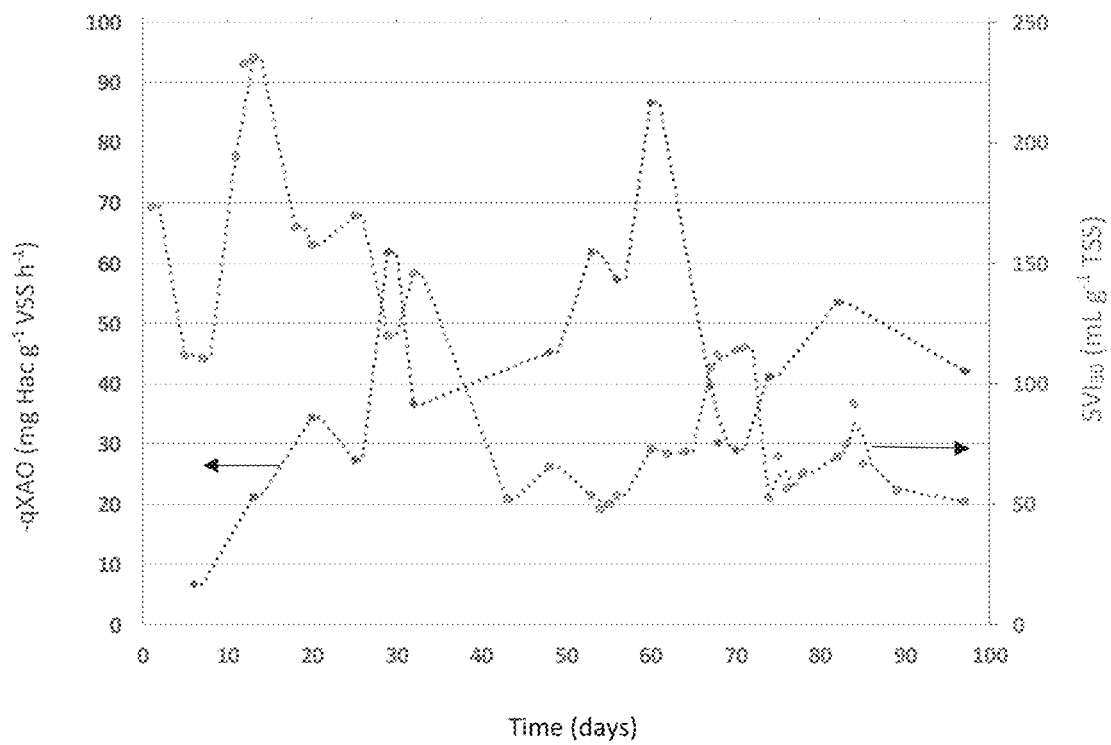
FIG. 4 shows the evolution of the sludge volume index as measured after 30 minutes (SVI30) and the storage kinetics (qXAO) during the tests on the pilot reactor according to the invention with (FIG. 4A) or without (FIG. 4B) the biological selector.

The tests carried out on a laboratory pilot which treats concentrated urban wastewater (UWW) have made it possible to show that exposing a biomass to alternating anaerobic and aerobic conditions in the second biological tank provides the means to generate dense, large-sized flocs enriched with phosphate-removing organisms. Combined with a microbial classification system, this method thus drastically enhances the sedimentation properties of the sludge. The term 'microbial classification' is used because the objective of the physical selector is to specifically maintain in the system the particles characterised by higher settling velocities. This classification therefore leads to more or less effective retention of biological aggregates in the system, and various different sludge ages depending on the size/density pairing. As a consequence, certain bacteria are found to be preferentially retained in the system, such as PAO/GAO. 40 days after starting the operation of the pilot reactor (inoculum: flocculent activated sludge), the first granular structures are visible (FIG. 3A). Relatively dense, these structures evolved into granules characterised by an SVI30 of less than 70 ml g$^{-1}$ (FIG. 4A). This densification of the biomass is achieved thanks to the setting up of conditions that are favorable to the selection of storage metabolisms. In concrete terms, the $COD_{fbio}$ is stored in the form of storage polymers under anaerobic conditions (PHAs). In the event of a reduction in the anaerobic storage efficiency (e.g. load peaks), the biological selector ensures degradation of the residual fraction into $COD_{fbio}$ under aerobic feast conditions, which is also favorable to the storage of the $COD_{fbio}$ in the form of PHA.

Figure 4B:
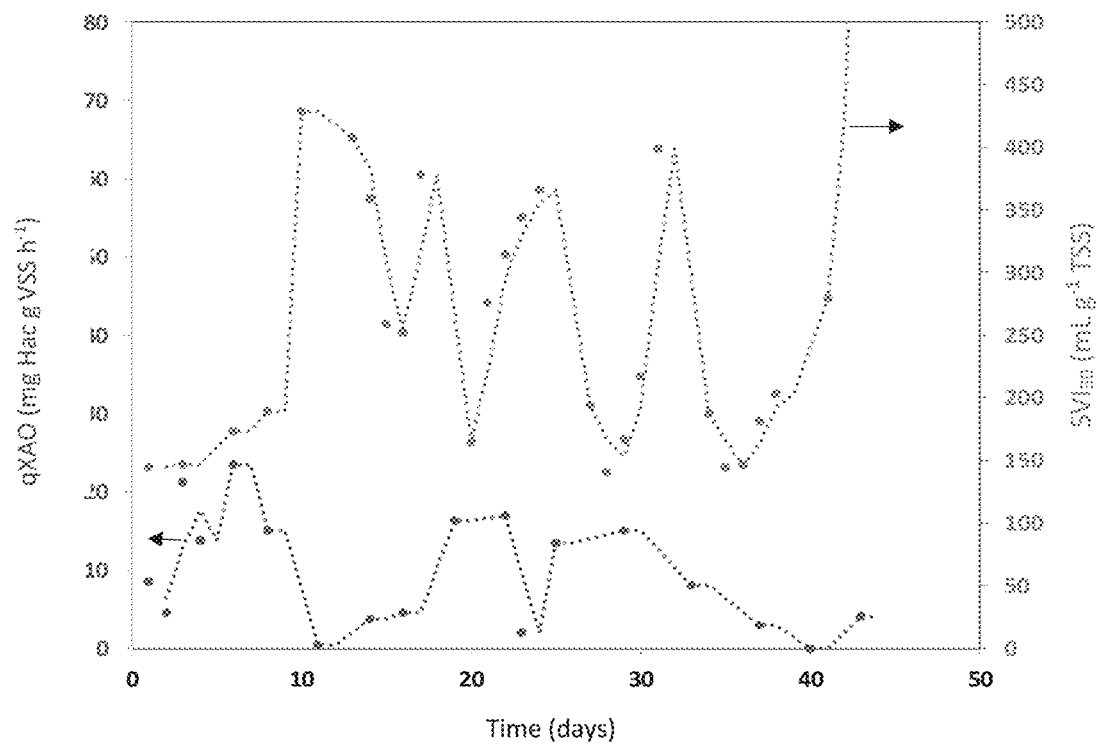

The ability of bacteria to store $COD_{fbio}$ in storage polymers was evaluated by measuring (batch tests) the specific rate of consumption (-qxAO) of acetate under anaerobic conditions. The results obtained show the importance of the biological selector (FIG. 4A and FIG. 4B) with respect to this parameter. In fact, in the absence of a biological selector, the SVI deteriorates very rapidly due to the development of filamentous bacteria. These observations support the conclusion that the microbial classification structure (physical selector) on its own does not provide the means for implementing a stable granular method (see below).

Physical Selection

The structuring of the flocs obtained by environmental selection pressure favors the setting up of a discrete sedimentation leading to a segregation of the biomass in a suitable hydraulic structure 18 (microbial classification). In concrete terms, it is a sedimentation structure in which the densest particles are collected and recirculated at the head of the facility. Conversely, the loosest flocs are transferred to the clarification structure and are progressively wasted.

Results

1. Process Tests and Results

In the context of the project according to the invention, the objective is to investigate a completely novel treatment configuration that is suitable for urban wastewater (UWW) regularly diluted by rain events or by an infiltration/exfiltration related problem in the collection network. Table 1 describes the main operating conditions tested during the testing undertaken. The experimental plan was divided into 3 stages so as to:

- optimize the coupling between the biological selection and the classifier (Periods or Phases I to III);
- analyze the resilience of the method to load peaks (Period or Phase IV);
- optimize the dynamic management of oxidation-reduction conditions in the biological selector (Periods or Phases V and VI).

TABLE 1

Operating Parameters for the Pilot and Classifier

| | | I | II | IIIa | IIIb | Iva | IVb | V | VI |
|---|---|---|---|---|---|---|---|---|---|
| | | | | Aerobic | ANDN ** | Peaks | | Recovery | Nominal |
| # Test Day | | 1-152 | 153-158 | 159-174 | 174-222 | 223-257 | 258-281 | 282-354 | 355-430 |
| $Q_{influent}$ average | L/hour | 14 | 5 | 5 to 26 | | 24 | 24 | 20 | 18 to 36 |
| $Qr_{granule}$ classifier | % influent flow rate | 70 | 225 | 225 to 70 | | 87 | 87 | 112 | 115 to 100 |
| $Qr_{sludge}$ classifier | % influent flow rate | 5 | 50 | 100 to 3 | | 3 | 3 | 3 | 3 |
| HRT | Hours | 10 | 30 | 30 to 5 | | 6 | 6 | 7 | 8 to 4 |
| Lv average | kg COD m$^{-3}$ d$^{-1}$ | 1.0 | 1.0 | 1.0 | | 0.9 | 1.5 | 1.3 | 0.6 to 1.5 |
| Lm average | kg COD kg$^{-1}$ VSS d$^{-1}$ | 0.360 | 0.278 | 0.276 | 0.223 | 0.303 | 0.413 | 0.465 to 0.325 | 0.134 to 0.334 |
| COD | mgO$_2$/L | 400 | 1300 | 1300 to 450 | 450 to 250 | 160 to 300 (P) | 315 to 390 (P) | 370 | 200 |
| Contact time first tank* | min | 80 | 90 | 45 | | 36 | 36 | 38 | 42 to 21 |
| Contact time second tank* | min | 25 | 30 | 15 | | 12 | 12 | 13 | 14 to 7 |
| Contact time third basin* | Hours | 4.3 | 5 | 2.6 | | 2.1 | 2.1 | 2.2 | 2.4 to 1.2 |
| Selection pressure | m/h | 1.20 | 0.62 | 0.62 to 2.50 | | 2.2 to 3.8 (P) | 2.2 to 3.8 (P) | 1.95 | 1.6 to 3.4 |

TABLE 1-continued

Operating Parameters for the Pilot and Classifier

|  |  | I | II | IIIa | IIIb | Iva | IVb | V | VI |
|---|---|---|---|---|---|---|---|---|---|
| SRTaverage | days | 20 | 20 | 30 | 25 | 20 | 11 | 10 to 20 | 20-10-20 |
| SRTaerated | days | 16 | 16 | 24 | 12 | 9 | 5 | 8 to 16 | 16-8-16 |
| Cv peak | kg COD m$^{-3}$ d$^{-1}$ | — | — | — | | 2.2 | 2.7 | | — to 2.7 |

*Average contact time
*Alternated Nitrification DeNitrification (as opposed to SNDN: Simultaneous Nitrification DeNitrification)

During the tests, the average N—NH$_4$ and P—PO$_4$ concentrations were respectively ~35 mg/L and ~6 mg/L.

The biological reactor (142 litres) is composed of a series of tanks as indicated below (represented schematically in FIG. 2):
  a first anaerobic tank 11 subdivided into three compartments (not numbered);
  a second tank 12 subdivided into two compartments 12A, 12B that are suitable for being operated successively and alternately under aerobic and anaerobic conditions, respectively under aerobic conditions;
  a third tank 13 which is suitable for being operated under anoxic or aerobic conditions.

The design of the microbial classification structure has been enhanced so as to:
  ensure the radial dispersion of the sludge at the inlet of the classification structure;
  avoid a phenomenon of flocculation on the walls of the prototype;
  promote a Stokes regime in order to classify the particles based on the size/density pairing;
  facilitate the recovery of dense sludge by a recirculation pump.

The reactor was set in operation to validate the start-up conditions on a diluted urban effluent (period I). The inoculum is an activated sludge originating from the wastewater treatment facility in Liège-Oupeye, Walloon Region, Belgium (TSS=4.4 g/L, SVI$_5$=218 mL/g, SVI$_{30}$=163 mL/g).

Figure 5:
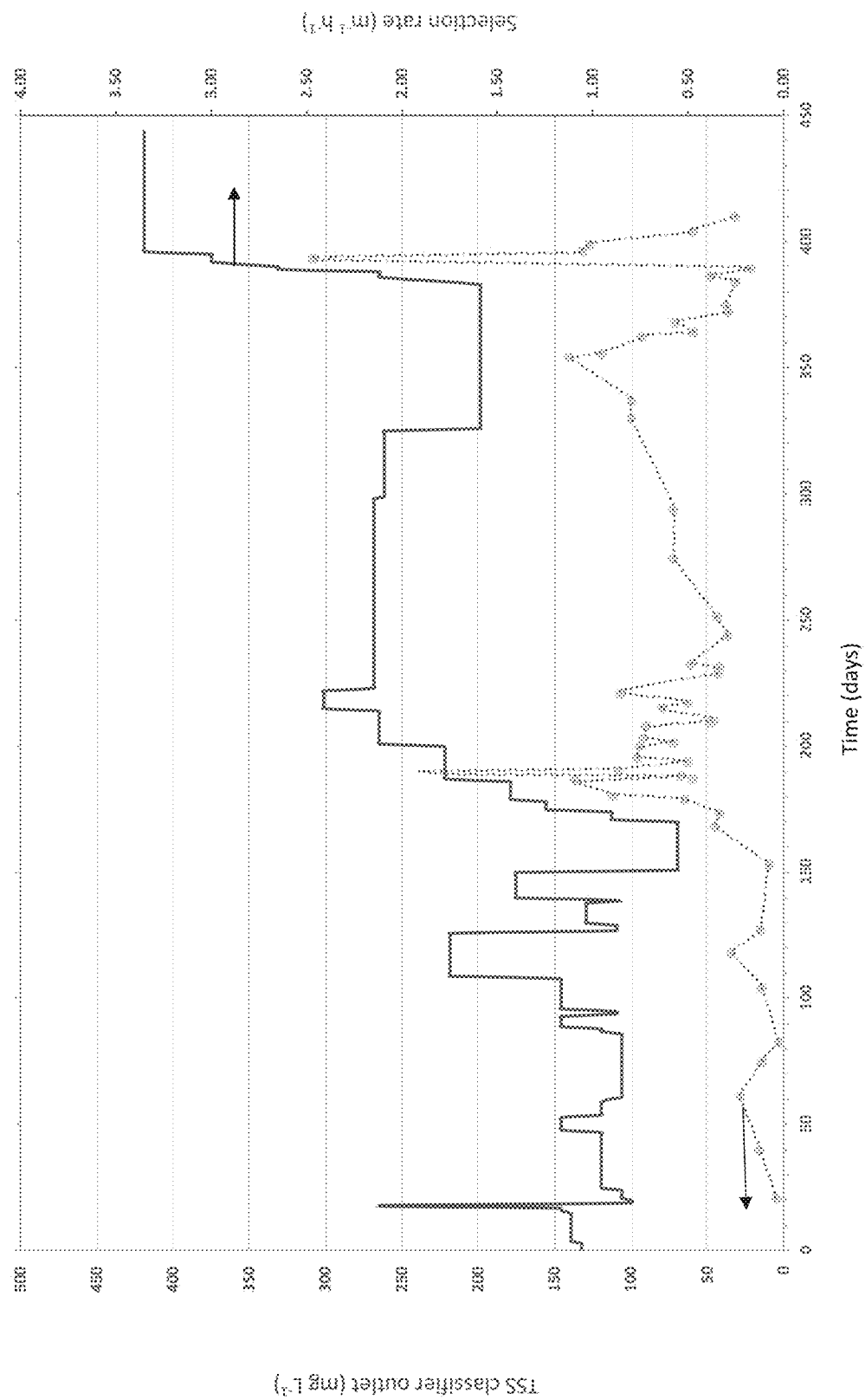
FIG. 5 shows the rise rate in the classifying structure (selection rate) and the selection pressure associated with the removal of the least dense particles (total suspended solids or TSS, classifier/physical selector outlet).
Figure 6:
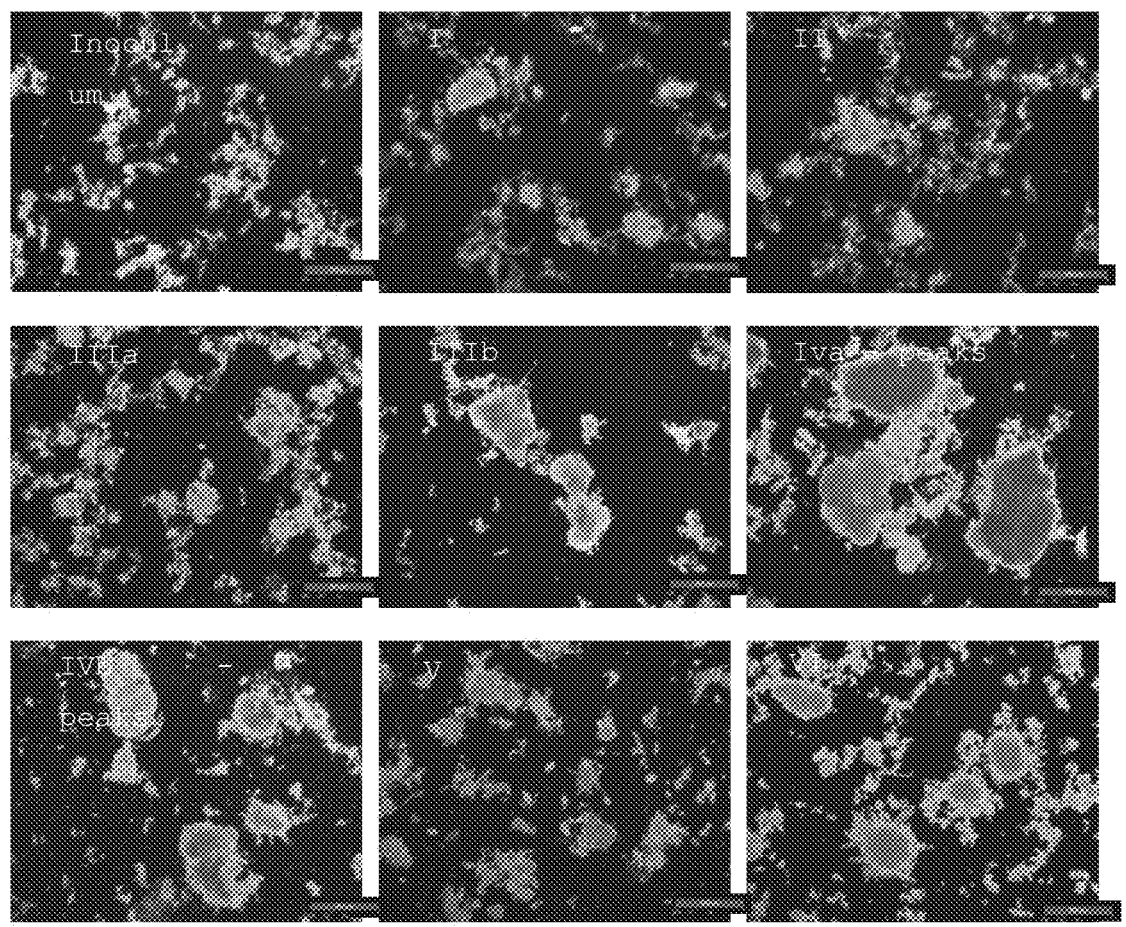
FIG. 6 shows the phase-contrast micrographs, at 4× magnification (scale bar: 500 microns), of the inoculum and biomasses at the end of each experimental phase (I, II, IIIa and b, IVa and b, V and VI).
Figure 7:
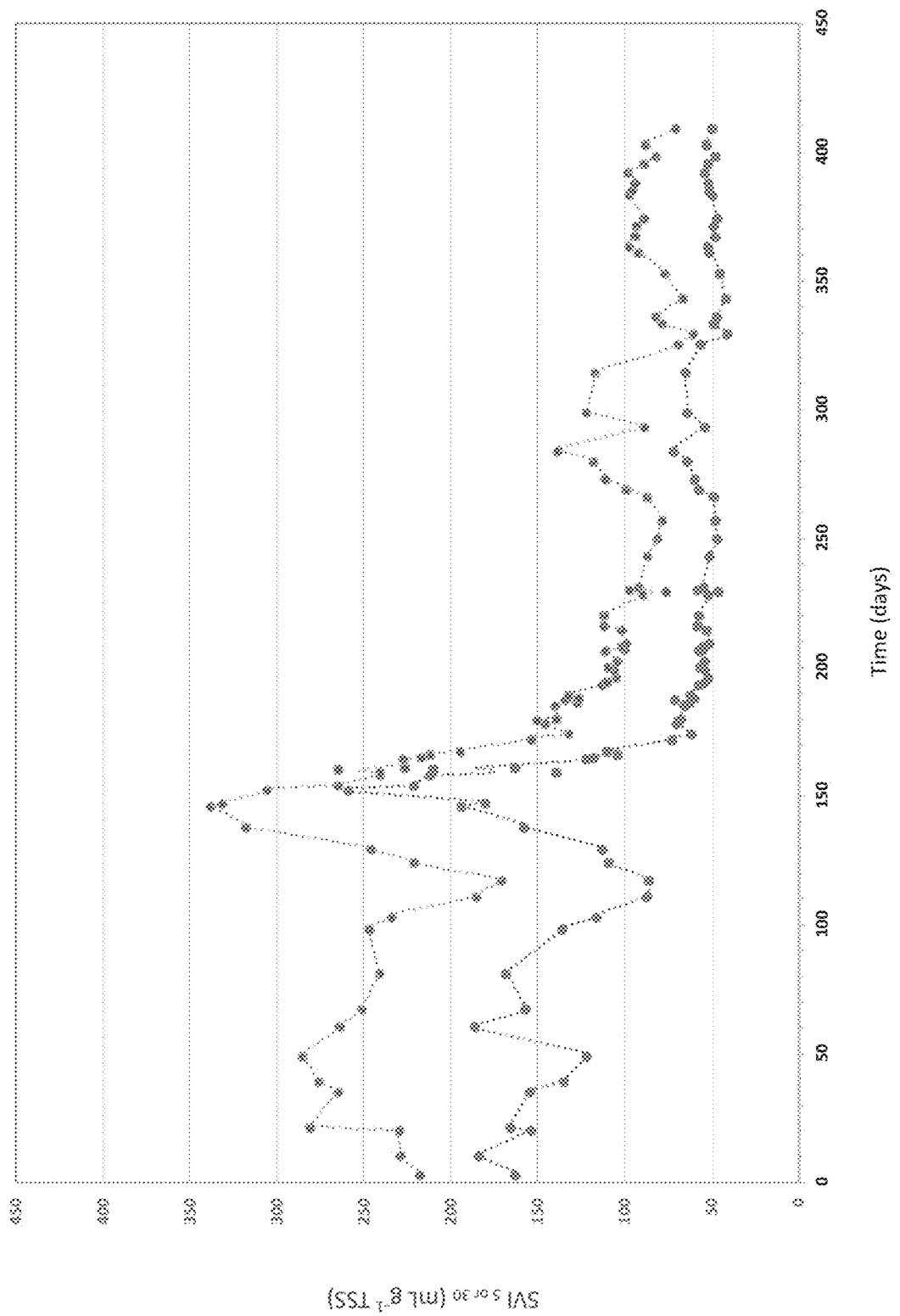
FIG. 7 shows the evolving change in the sludge volume index during the period of operation of the reactor, as measured after 5 (SVI5, top) and 30 minutes (SVI30, bottom) respectively.

After a start-up and trial/error phase, the pilot was used advantageously to identify the impact of various parameters which could be the cause of the malfunctions observed, such as contact times (aerobic, anaerobic), the impact of the nitrate returns and the thickening time in the classifier. The results obtained during the different phases III showed that a reduction in contact times in the anaerobic compartments and in the aerobic biological selector were the parameters with the greatest impact on the quality of the sludge obtained. A progressive increase in selection pressure in the classifier (FIG. 5), while at the same time maintaining constant contact times (anaerobic: 45 min; aerated selector: 15 min), made it possible to develop stable granules (FIG. 6; IIIb) for a stationary hydraulic regime. When the pilot was supplied with diluted wastewater (COD<400 mg O$_2$/L, Table 1, Period IIIb), a reduction in the recirculation flow rate of the classifier (Qr$_{granule}$ classifier) provided the ability to maintain concentrations of COD$_{fbio}$ in contact with the biomass at between 20 and 100 mg O$_2$/L in the first compartment of the first tank; these conditions being favorable to ensuring feast mode in the first and second tanks of the pilot.

During Period IIIb, the granular sludges exhibit stable morphological and physical-chemical properties. The diameter of the granules varies between 0.2 and 0.6 mm. The purification performance outcomes were estimated on the basis of spot sampling. They are stable with the removal of more than 90% of total COD, 95% of ammoniacal nitrogen, and 81% of total nitrogen. The average TSS concentration at the outlet of the clarifier was 20.4 mg/L.

During Phase IVa, purification assessments were established and weekly samples were taken at the inlet of the pilot facility to determine with precision the load received by the structure according to the invention. The parameters analysed were the TSS, total and soluble COD, total Kjeldahl nitrogen (TKN), N—NH$_4$, N—NO$_3$, N—NO$_2$, total nitrogen (by calculation), P—PO4 (o) and P$_{tot}$ in accordance with international standards (American Public Health Association (APHA) 2005).

Table 2 shows the average purification performance outcomes during period IVa. The average temperature was 20° C.

TABLE 2

Average Purification Performance Outcomes during Phase IVa.
Average sampling: 24 hours (n = 3)

| Parameters | Influent mg/L | Effluent mg/L | Purification % |
|---|---|---|---|
| COD | 185 | 35 | 81 |
| CODs |  | 27 | 85 |
| N$_{tot}$ | 28 | 6.8 | 76 |
| N$_{KJ}$ |  | 2.9 | 90 |
| N—NH$_4$ |  | 2.3 | 92 |
| N—NO$_3$ |  | 3.9 |  |
| P$_{TOT}$ | 4.8 | 1.9 | 60 |
| P—PO$_4$ |  | 1.4 | 71 |
| TSS |  | 9 |  |

Figure 9:
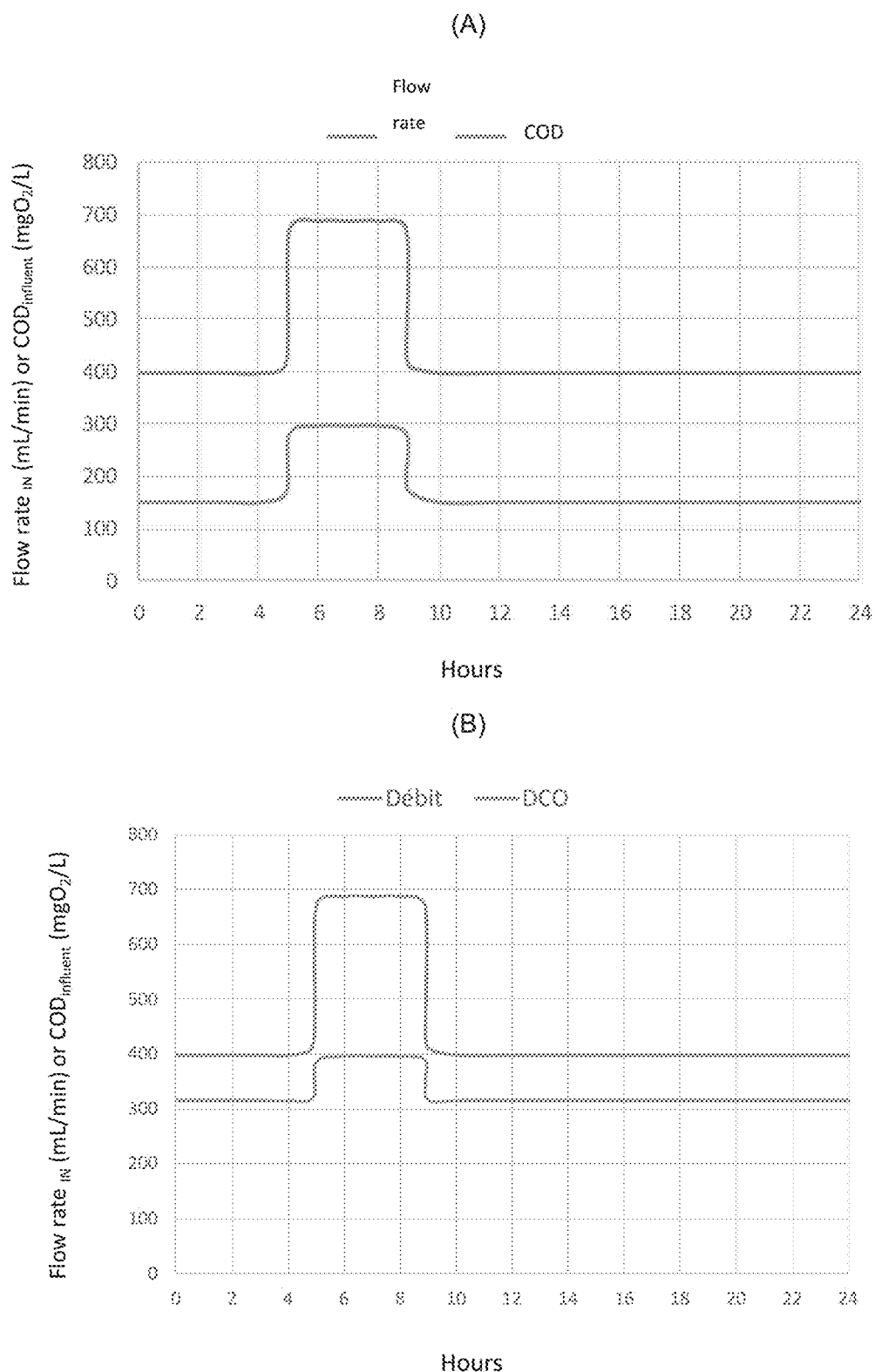
FIG. 9 shows the hourly flow rates and COD concentrations at the inlet of the pilot plant during phases IVa (FIG. 9A) and IVb (FIG. 9B), respectively.

During Phase IVb, the daily organic load to be treated was increased by 66% while at the same time maintaining a daily hydraulic profile that is identical to Phase IVa (FIG. 9).

During Phases V and VI, the management of the biological selector (1$^{st}$ compartment) was adapted so as to increase the metabolic and kinetic selection pressure.

Figure 8:
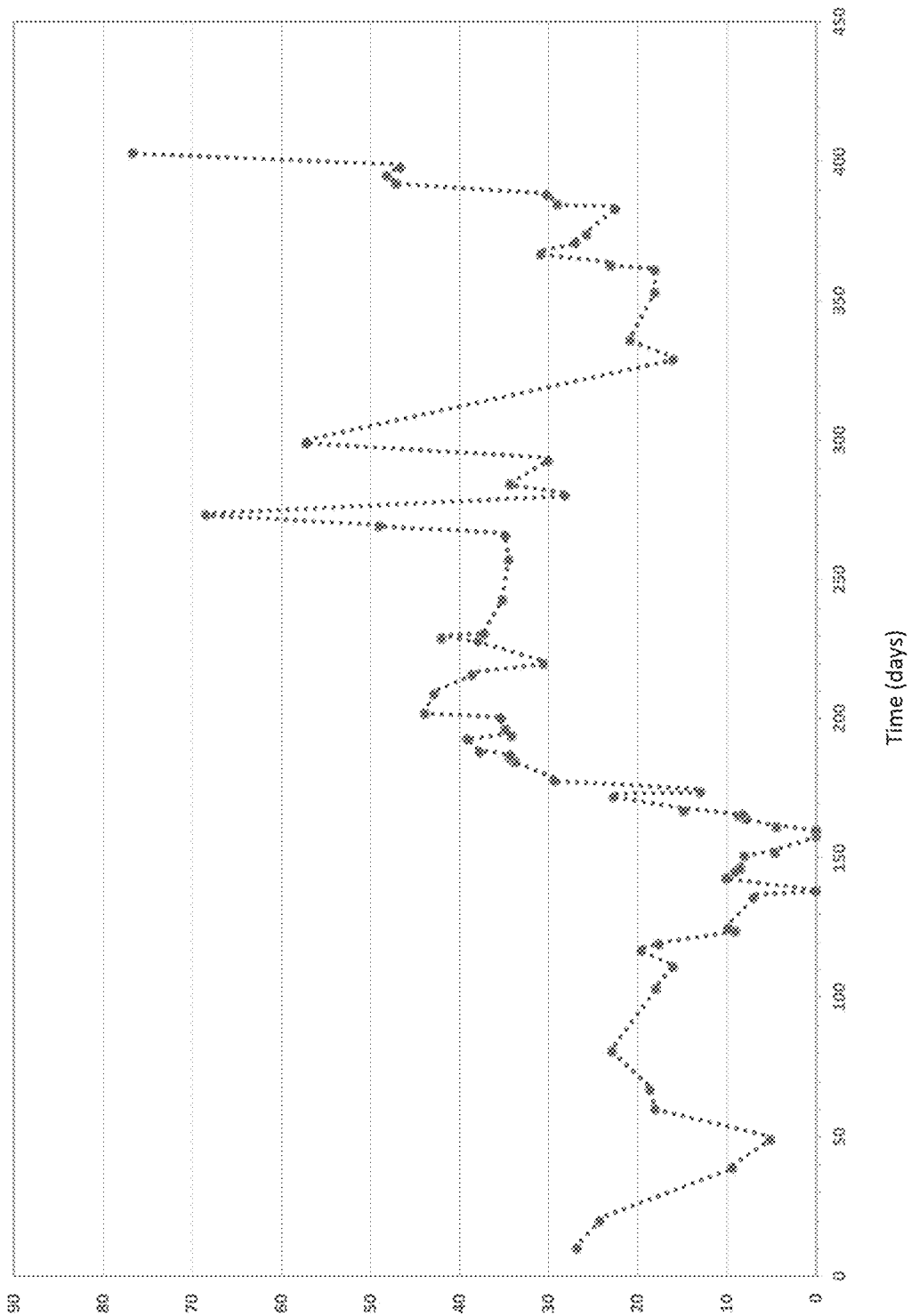
FIG. 8 shows the evolving change in the storage kinetics (qXAO) during the tests on the pilot reactor.

In concrete terms, the first compartment of the biological selector was no longer aerated during phase V to optimise the anaerobic contact time with the incoming load. This adaptation made it possible to stabilize the pilot in stationary conditions. Thereafter (from day 374—Phase VI), this same compartment was aerated so as to maintain an oxygen set point greater than 1.5 mg/L. When the aeration capacity was insufficient to maintain this set point value, the tank was no longer aerated. After a certain period of downtime (typically 10 minutes), the tank was again reoxygenated. This aeration strategy made it possible to increase the kinetics of storage of readily biodegradable[1] COD (FIG. 8) thanks to an advanced metabolic selection under coupled anaerobic conditions (dynamic extension of the anaerobic contact time) and a kinetic selection under aerobic conditions. Under these operating conditions and for an average sludge age of 20 days, the method according to the invention demonstrated good resilience in the face of load variations. It should also be noted that the stability of the system was observed for a mass load of less than 0.35 kg COD kg$^{-1}$ VSS d$^{-1}$ to maintain the famine conditions in the third tank. Indeed, the sludge obtained after a few weeks of testing was in the form of dense, stable microbial aggregates measuring between 0.1 and 0.6 mm in diameter, and the settling velocity observed was greater than 3.4 m/h, thus making it possible to maintain a high concentration of granular sludge in the reactor (MLSS: 9.4 g/L; 94% VSS).

[1] In the typology of wastewater, each major class of pollutant is fractionated according to the physical state (settleable, coagulable, and soluble fractions) and biodegradability (readily/rapidly biodegradable, not readily/slowly biodegradable, and inert/non-biodegradable fractions). Ref: www.suezwater-handbook.fr.

This high concentration of granules secured treatment at high average organic loads (~1.5 kg COD m$^{-3}_{reactor}$ J$^{-1}$) and low hydraulic residence times (~4 hours). Furthermore, the purification performance outcomes continued to be correct with the removal of more than 86% of the total COD and 74% of the total nitrogen. However, the removal of phosphorus remained low (28%) and was probably hampered by the low COD/P ratio combined with the development of GAO which then competed with PAO for the same substrates.

Table 3 shows the average purification performance outcomes at the end of Phase VI.

TABLE 3

Average Purification Performance Outcomes at the End of Phase VI.
Average sampling: 24 hours.

| Parameters | Influent mg/L | Effluent mg/L | Purification % |
|---|---|---|---|
| COD | 179 | 25 | 86 |
| CODs |  | 11 | 94 |
| $N_{tot}$ | 32 | 8.2 | 74 |
| $N_{KJ}$ |  | 1.5 | 95 |
| N—NH$_4$ |  | 0.6 | 98 |
| N—NO$_3$ |  | 6.7 |  |
| P—PO$_4$ (o) | 6.0 | 4.3 | 28 |
| TSS |  | 14 |  |

2. Microbial Ecology

The essence of granulation is based on good management of microbial populations. The objective is to identify microbial indicators confirming proper functioning of the method to provide an additional tool optimizing the parameterization of the demonstrator according to the invention.

Figure 10:
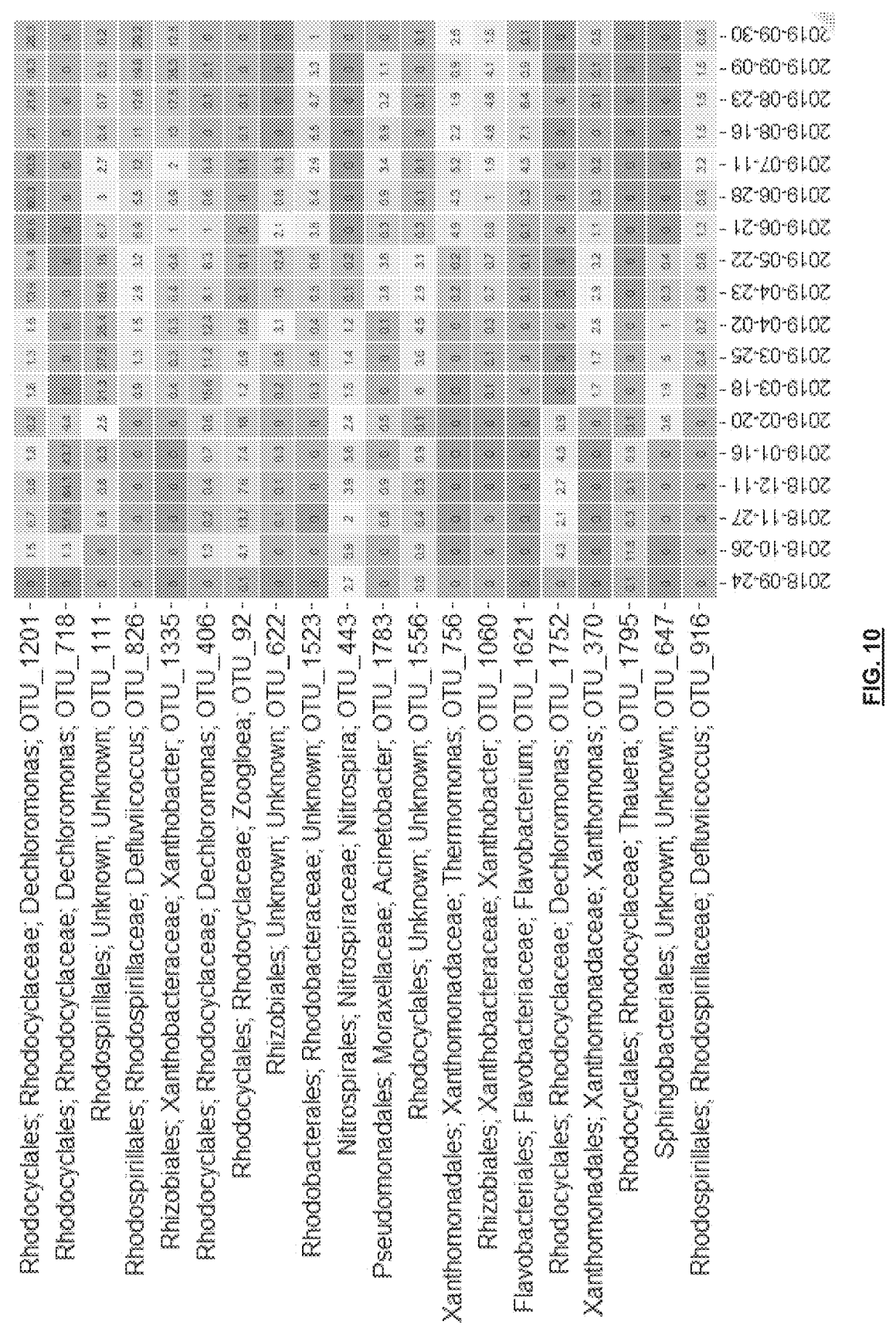

As mentioned above, the method according to the invention is based on a biological selection coupled with a physical selection (classifier). FIG. 10 shows a chart that maps the 20 operational taxonomic units (OTU) that are most abundant during pilot operation.

Figure 11:
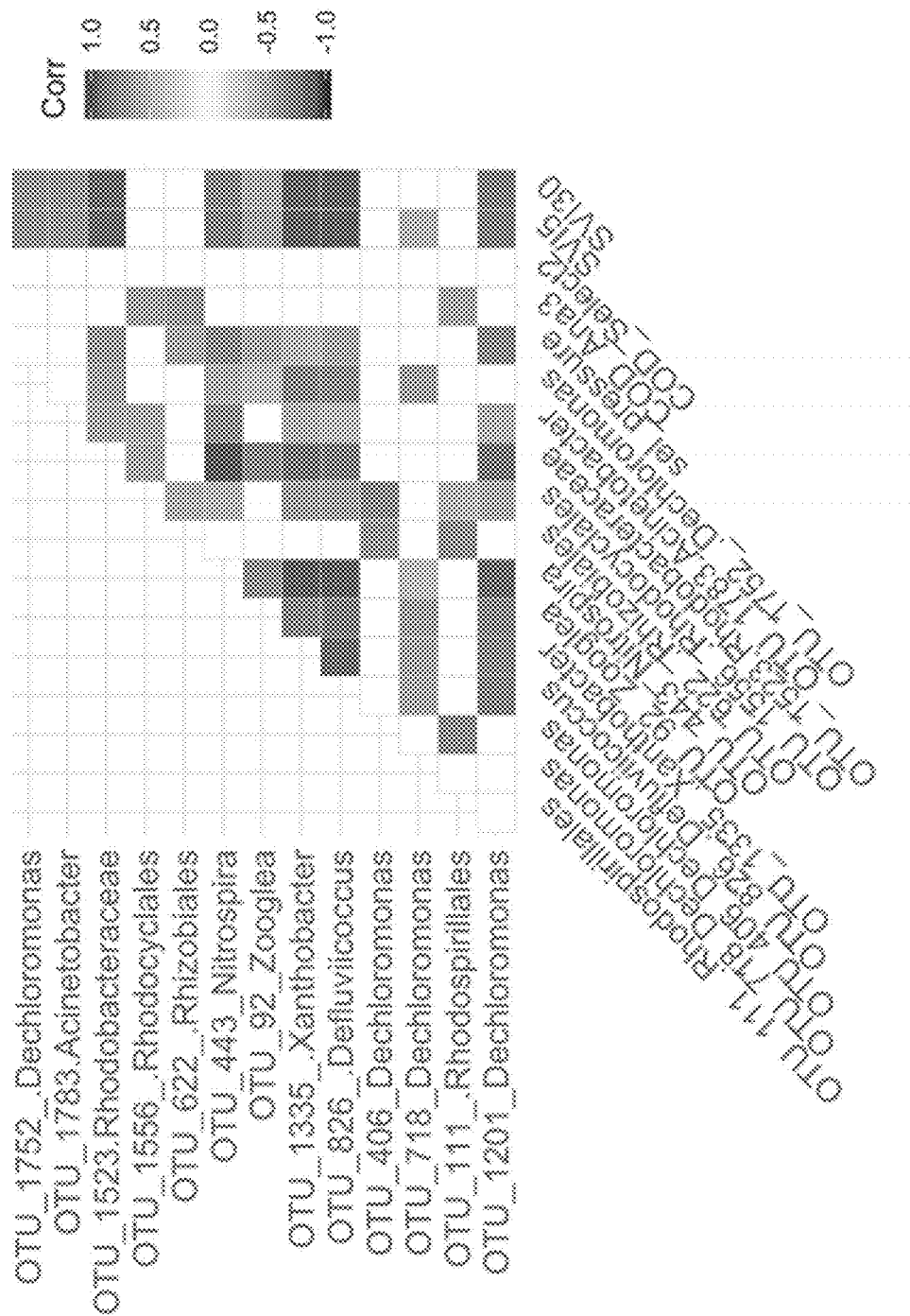
FIG. 11 shows the Spearman's correlations (C) r (with a value of p<0.05) for the OTUs [operational taxonomic units] having an abundance of "reads" greater than 1%, the selection pressure applied on the physical classifier/selector (sel_pressure in m/h), the soluble COD respectively in the third anaerobic compartment (COD_Ana3) and the second compartment of the biological selector (COD_Select2), the SVI as measured respectively after 5 (SVI5) and 30 minutes (SVI30). The calorimetric scale corresponds to the respective values r: 0.0 to 0.19 'C very low'; 0.20-0.39 'C low'; 0.40-0.59 'C moderate; 0.60-0.79 'C. high; 0.80-1.0 'C. very high'.

Dechloromonas (OTUs 406, 718, 1201, 1752) represents the bacterial genus that is most abundant during the entirety of the tests. A correlation (Spearman) analysis shows that OTU 1201 is maintained in the system thanks to an increase in the selection pressure on the classifier (FIG. 11; r value of 0.798; p=7 10$^{-5}$). It is associated with superior sludge qualities (r value of 0.721; p=7 10$^{-4}$) while other OTUs of the same genus (406, 718, 1752) are abundant in sludges having a high SVI. Dechloromonas is capable of assimilating volatile fatty acids under anoxic conditions. Although certain species exhibit a PAO phenotype, the various OTUs identified in the sludge used are not correlated with the phosphorus removal performance outcomes. The removal of phosphorus by overaccumulation would be mainly ensured by Candidatus accumulibacter (0.5% on average) and Tetrasphaera (<0.1%).

The genus Defluviicoccus that competes with the PAOs for the same substrates, is also well represented. The relative abundance of this glycogen accumulating bacterium (GAO), that is conventionally observed in granular sludge, is nevertheless highly variable. This genus is particularly abundant in the reactor according to the invention provided that the anaerobic contact time is less than 80 minutes. An increase in the selection pressure on the classifier also serves the purpose of enriching the biomass with Defluviicoccus.

The genus Acinetobacter and OTU 1523 of the Rhodobacteraceae family are also found, these being associated with a compact sludge.

Also to be noted is the presence of Zoogloea spp. (up to 16%), belonging to the order of Rhodocyclales, during the phases wherein the method malfunctions (excessively long anaerobic contact time). Although often considered to be favorable to granulation by participating in the structural maintenance of granular architectures, this bacterial genus is mainly known for its capacity to produce extracellular polymers (extracellular polymeric substances, or EPS), which can lead to a viscous "bulking" phenomenon. In the context of the method according to the invention, Zoogloea spp. therefore constitutes an indicator of dysfunction of the biological selector.

3. Conclusions from the Tests

The objectives of this task were as follows:
(1) optimizing the parameters relating to the dimensioning of the prototype (for the construction of the "in situ" demonstrator);
(2) validating the control strategy for the method; and
(3) identifying the microbial indicators confirming proper functioning of the method.

The tests provided the means to confirm the technical feasibility of forming granules characterized by a settling velocity greater than 3.4 m/h on diluted synthetic urban water. The teachings derived from this research are as follows:

avoid oversizing the anaerobic tank;
limit the hydraulic load on the classifier by implementing a by-pass;
ensure dynamic management of the oxidation-reduction conditions of the biological selector.

Under these conditions, an occasional increase in the hourly load did not affect the stability of the granules, thereby making it possible to maintain a high concentration of sludge (up to 9.4 g/L; 94% VSS) in the tanks while also operating the unit at high average organic loads (>1.3 kg COD m$^{-3}$ reactorD$^{-1}$). Furthermore, the purification performance outcomes continued to be correct with the removal of more than 86% of the total COD, 74% of the total nitrogen, and 28% of the total phosphorus.

This study also confirms that the final settling surface areas—for clarifying the effluent—may be significantly reduced.

In terms of microbial ecology, it should be noted that
the method according to the invention particularly favours the GAO Defluviicoccus and an OTU of the genus Dechloromonas which is probably involved in the denitrification;
the type of influent used and the parameterisation do not particularly favour the PAOs that are usually observed in granular sludge (Ca. Accumulibacter or Tetrasphaera);
monitoring of Zoogloea spp. enables the detection of any dysfunction of the biological selector.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SYMBOLS

1 Aerobic granular sludge reactor
11 Anaerobic head tank (1$^{st}$ tank)
12 Aerobic tank (2$^{nd}$ tank, biological selector)
12A First compartment of the second tank (dynamic, feast)
12B Second compartment of the second tank (continuous, feast)
13 Aerobic or anoxic tank (3$^{rd}$ tank, famine)
14 Settler or clarifier
15 Recirculation of sludge
16 Recirculation of nitrates
17 Wasting of sludge
18 Physical or gravity selector/classifier (separation of solids)
19 Reactor inlet
22 Anoxic tank
25 Recirculation of granules

LIST OF ABBREVIATIONS

| List of Abbreviations | | |
|---|---|---|
| Abbreviation | Significance | Unit |
| A2O | Aerobic/anoxic/oxidation | |
| AGS | Aerobic granular sludge | |
| BNR | Biological Nutrient Removal | |
| CAS | Conventional activated sludge | |
| Lm | Mass load | kg COD kg$^{-1}$ VSS d$^{-1}$ |
| Lv | Volumetric load | kg COD m$^{-3}$ d$^{-1}$ |
| COD | Chemical oxygen demand (COD) | mg O$_2$/L |
| EBPR | Enhanced biological phosphorus removal | |
| EPS | Extracellular polymer substance | |
| UWW | Urban wastewater | |
| F/M | Food/Microorganism ratio | kg COD kg$^{-1}$ VSS |
| GAO | Glycogen accumulating organism | |
| HRT | Hydraulic retention time | |
| IFAS | Integrated Fixed Film Activated Sludge | |
| MBBR | Moving bed bioreactor | |
| MBR | Membrane bioreactor | |
| TSS | Total suspended solids | mg L$^{-1}$ |
| MLSS | Mixed liquor suspended solids (Solids suspended in activated sludge) | g L$^{-1}$ |
| VSS | Volatile suspended solids | mg L$^{-1}$ |
| OTU | Operational taxonomic unit | |
| SOUR | Specific oxygen uptake rate | O$_2$ g$^{-1}$ VSS h$^{-1}$ |
| PAO | Phosphate accumulating organism | |
| PHA | Polyhydroxyalkanoate | |
| qXAO | Specific acetate consumption rate under anaerobic conditions | mg COD$_{HAC}$ g$^{-1}$ VSS h$^{-1}$ |
| Q$_{influent}$ | Influent flow rate | L/hour |
| Q$_{r\ (granule\ or\ sludge)}$ | Percentage of influent flow rate | % Q$_{influent}$ |
| SBR | Sequential batch reactor | |
| SVlx | Sludge volume index | |
| SNDN | Simultaneous nitrification denitrification | mL g$^{-1}$ TSS |
| SRT | Solid retention time | days |

The invention claimed is:

1. A reactor for generation of aerobic granules in a continuous flow configuration for biological treatment of biomass including urban or industrial wastewater, the reactor comprising, in succession, from upstream to downstream:
an inlet for wastewater;
a first head tank operable in feast mode and under anaerobic conditions;
a second tank configured to biologically select microorganisms favorable to formation of dense structures, operable in feast mode, and subdivided into two compartments, a first compartment being configured so as to be operable successively and alternately under aerobic and anaerobic conditions and vice versa, so that the biomass is exposed in a dynamic way to alternating oxidizing and reducing conditions respectively, and so as to prolong or extend anaerobiosis of the first head tank into the first compartment of the second tank, and to effect a corresponding prolongation of a storage of at least 70% of readily biodegradable COD in a form of polymers, and a second compartment configured so as to be operable continuously under aerobic conditions;
a third tank operable in famine mode, configured so as to be controlled under aerobic or anoxic conditions, famine conditions being obtained by limiting a mass load to 0.35 kg COD kg$^{-1}$VSS day$^{-1}$; and
a physical or gravity selector configured to select particles with a high settling velocity of at least 2 m/h, and for carrying out a recirculation of the particles to the inlet of the reactor while also allowing for transfer of other sludge to a clarification structure, the clarification structure comprising a first outlet for an effluent and a second outlet for the recirculation of sludges to the third tank of the reactor and for wasting of excess sludge, wherein the first compartment of the second tank are provided with aeration means, means for measuring a content of dissolved oxygen and a quantity of injected air, based on an air flow rate or an operating speed of the aeration means, and regulation-control means that enable, by controlling aeration, switching from the aerobic mode to the anaerobic mode and vice versa in the first compartment of the second tank based on a set point value for an oxygen demand, the oxygen demand being measured as a quantity of oxygen to be supplied so as to reach and maintain a determined content of dissolved oxygen as the set point value, in $mgO_2/L$, the anaerobic mode being selected or maintained for a value greater than the set point value.

2. The reactor of claim 1, wherein the first compartment and the second compartment of the second tank have substantially a same size, each of these compartments being smaller than the third tank.

3. The reactor of claims 1, wherein a distribution of relative sizes of the first, second, and third tanks in relation to an available volume is respectively from 20 to 30% for the first tank, 5 to 10% for the second tank, and 60 to 75% for the third tank.

4. The reactor of claim 1, wherein the first tank is compartmentalized.

5. The reactor of claim 1, further comprising:
a bypass to limit the hydraulic load on the physical or gravity selector.

6. A method for biological treatment of urban or industrial wastewater by the reactor of claim 1, the method comprising, in succession, in the upstream to downstream direction:
introducing the wastewater at the inlet of the continuous flow reactor;
treating the wastewater in the first head tank operated in feast mode and under anaerobic conditions;
treating in the second tank wastewater exiting from the first head tank, the second tank performs the function of a biological selector of microorganisms that are favorable to the formation of dense structures comprising granules, the first compartment being operated in feast mode according to dynamic management of an oxygen supply, based on a measurement, in the first compartment of the second tank, of a content of dissolved oxygen and a quantity of air injected, based on air flow rate or an operating speed of the aeration means, the measurement or operating speed being translated into an oxygen demand value, which is a parameter selected to switch from the aerobic operating mode to the anaerobic operating mode and vice versa, and the second compartment being operated continuously under aerobic conditions, in feast mode;
treating in the third tank, operated under aerobic or anoxic conditions, in famine mode, wastewater exiting from the second tank;
in the physical or gravity selector, leaving the granules to sediment and recirculating a fraction of the granules at the inlet of the continuous flow reactor; and
in the clarification structure, allowing an effluent to exit the reactor at a first outlet and, at a second outlet, recirculating the sludge, to the third tank of the continuous flow reactor, with a portion of the sludge being wasted,
wherein, by dynamic management of the oxygen supply, an anaerobiosis phase taking place in the first head tank is prolonged/extended into the first compartment of the second tank, as long as an oxygen demand is greater than a set point value of 30-50 mg $O_2$ $g^{-1}VSS$ $h^{-1}$, the oxygen demand being measured as a quantity of oxygen to be supplied so as to reach and maintain the set point value, a period of pause in aeration then being observed before resuming aeration and a phase of aerobiosis, based on a hydraulic residence time in the first compartment of the second tank being between 5 and 30 minutes and therefore chosen to increase efficiency of storage of the readily biodegradable COD in a form of polymers while also limiting leakage of readily biodegradable COD into the third tank,, and to minimize a production of nitrites and nitrates.

7. The method of claim 6, wherein the stored polymers comprise PHAs.

8. The method of claim 6, wherein the prolongation/extension of the anaerobiosis phase into the first compartment of the second tank takes place upon load peaks.

9. The method of claim 6, wherein a rate of recirculation of sludges in the clarification structure is modified to vary and control a rise rate in the physical or gravity selector and therefore a granule selection pressure.

10. The method of claim 6, wherein an abundance of a floc-forming microorganism is monitored to detect dysfunction in the biological selector.

11. The reactor of claim 1, wherein the storage is of at least 90% of readily biodegradable COD.

12. The reactor of claim 1, wherein the mass load is limited 0.25 kg COD $kg^{-1}VSS$ $day^{-1}$.

13. The reactor of claim 1, wherein the high settling velocity is at least 3 m/h.

14. The method of claim 10, wherein the floc-forming microorganism comprises Zoogloea spp.

* * * * *